UNITED STATES PATENT OFFICE.

V. L. MAXWELL, OF WILKES-BARRÉ, PENNSYLVANIA.

IMPROVEMENT IN THE MANUFACTURE OF GUNPOWDER.

Specification forming part of Letters Patent No. 26,602, dated December 27, 1859.

*To all whom it may concern:*

Be it known that I, V. L. MAXWELL, of Wilkes-Barré, in the county of Luzerne and State of Pennsylvania, have invented a new and useful Improvement in the Manufacture of Gunpowder; and I do hereby declare that the following is a full, clear, and exact description of the same.

The nature of my invention consists in substituting alcohol for water in the mixture of the ingredients for gunpowder preparatory to the granulating thereof. It is well known that good powder should not contain more than seven per cent. of water, else it will foul the gun and lose its strength. By my improvement I not only avoid the disadvantages above named, but produce an article superior to any mixed with water.

To enable others skilled in the art to make my improved gunpowder and practice the process by which it is manufactured, I will describe the same in as brief and clear language as possible.

Gunpowder is composed of purified sulphur, niter or saltpeter, and charcoal, in the proportion of about seventy-six of niter, fourteen of charcoal, and nine of sulphur, which are first reduced to a finely-subdivided condition by grinding separately. In about the proportions stated they are all intimately mixed together in certain quantities in what may be called a large "mortar." The vehicle commonly employed to unite the particles of these together and impart to them cohesive qualities is water. As a substitute for this I employ either pure or diluted alcohol. That which ranges from about eighty to ninety per cent. of pure spirit answers very well. The amount required for any quantity of dry materials is just that which will reduce the whole to a pasty mass, which is afterward pressed into the form of cakes, that are cut into slices, dried, made into grains in sieves, and then glazed, according to the common processes practiced in making gunpowder. These mechanical manipulations form no part of my invention, and do not therefore require to be more particularly described.

The superiority of alcohol, pure or slightly diluted, as a cohesive vehicle over water in mixing the dry ingredients of gunpowder consists in its being highly combustible itself. After the powder is therefore made into cakes and is dried it contains less moisture than powder made with water. It is therefore more easily ignited, keeps a longer time without losing its power, and, not being so damp, is much stronger, because moisture in gunpowder takes up considerable latent heat when it is ignited, and thus detracts from its expansive power. As alcohol is very combustible, when the powder is ignited a higher degree of heat is generated and a greater expansive force is obtained than from a like quantity made with water.

I am well aware that a solution of the chlorate of potassa has been used as a mixture with water for a vehicle in making gunpowder; but it renders powder more hygrometric than alcohol, and is not therefore so good for this purpose.

By experiments I have found that gunpowder made with my vehicle—common alcohol—is much drier, ignites more rapidly and uniformly, and exerts a greater expansive force than that made with water. I use the common alcohol of commerce because pure alcohol is so very difficult to obtain.

Having thus described my invention, I claim as an improvement in the manufacture of gunpowder and desire to secure by Letters Patent—

The employment of alcohol in lieu of water as the vehicle to unite the particles of the ingredients of which the powder is to be composed, substantially as and for the purpose herein shown and described.

V. L. MAXWELL.

Witnesses:
STEPHEN NAUGHN,
HENDRICK B. WRIGHT.